United States Patent
Wu

(10) Patent No.: US 6,412,129 B1
(45) Date of Patent: Jul. 2, 2002

(54) INFLATION DEVICE CAPABLE OF PERIODIC INFLATION AND DEFLATION

(76) Inventor: Race Wu, 3F, No. 82, Yi-Ping Rd., Yi-Hsin Village, Tai-Ping City, Taichung Hsien (TW)

(*) Notice: Subject to any disclaimer, the term of this patent is extended or adjusted under 35 U.S.C. 154(b) by 107 days.

(21) Appl. No.: 09/663,921

(22) Filed: Sep. 18, 2000

(51) Int. Cl.[7] ............................................. A47C 27/10
(52) U.S. Cl. .............................................. 5/713; 5/710
(58) Field of Search ............................ 5/713, 710, 714, 5/715, 712, 711

(56) References Cited

U.S. PATENT DOCUMENTS

| | | | |
|---|---|---|---|
| 5,117,518 A | 6/1992 | Schild | 5/713 |
| 5,189,742 A * | 3/1993 | Schild | 5/713 |
| 5,676,639 A * | 10/1997 | Schild | 5/713 |

* cited by examiner

*Primary Examiner*—Alexander Grosz
(74) *Attorney, Agent, or Firm*—Browdy and Neimark, P.L.L.C.

(57) ABSTRACT

An inflation device comprises an electrically-driven air pump, a rotary valve, two sets of air sacs, and a pressure control unit. The air sacs are connected with the rotary valve which is in turn connected with the air pump. The air sacs are kept in the state of periodic and alternate inflation and deflation. The magnitude of pressure of the compressed air from the air pump is detected by the pressure control unit so as to interrupt or resume the power supply to the air pump.

5 Claims, 1 Drawing Sheet

INFLATION DEVICE CAPABLE OF PERIODIC INFLATION AND DEFLATION

FIELD OF THE INVENTION

The present invention relates generally to an inflation device, and more particularly to an inflation device capable of inflating and deflating periodically.

BACKGROUND OF THE INVENTION

The U.S. Pat. No. 5,117,518 discloses an inflatable mattress which comprises a pump, a rotary valve, and two sets of mattress air sacs. The compressed air is alternately sent from the pump to the mattress air sacs via the rotary valve. The air pressure of the mattress air sacs is controlled by two sensor air sacs, which are connected with the mattress air sacs. Whenever the air pressure of the mattress air sacs is excessively high, a deflation valve is triggered by the sensor air sacs to deflate the mattress air sacs. Such a prior art disclosure as described above is defective in design in that the pump must be kept constantly in operation, thereby resulting in an additional cost for electric consumption as well as a reduction in service life span of the inflatable mattress.

SUMMARY OF THE INVENTION

The primary objective of the present invention is to provide an inflation device capable of temporary interruption of power supply to the inflation device at such time when the air pressure of the air sac is excessively high.

In keeping with the principle of the present invention, the foregoing objective of the present invention is attained by the inflation device comprising a pump, a rotary valve, two sets of air sacs, and a pressure control unit. The pump is used to provide compressed air. The rotary valve has one inlet in communication with the pump, and two outlets which are connected with the two sets of air sacs so as to enable the air sacs to be inflated and deflated periodically and alternately. The pressure control unit comprises a fixed electrode member, a pliable electrode member, and a pressure detecting air sac. The fixed electrode member and the pliable electrode members are respectively connected to a power source and the pump. The pressure detecting air sac is connected with a pipeline between the rotary valve and the pump. When the pressure of the pipeline is greater than a predetermined value, the pliable electrode member is pushed by the pressure detecting air sac to separate from the fixed electrode member, thereby resulting in an interruption of power supply to the pump. When the pressure of the pipeline is smaller than the predetermined value, the pliable electrode member resumes in contact with the fixed electrode member so as to resume the power supply to the pump.

DETAILED DESCRIPTION OF THE INVENTION

Figure 1:
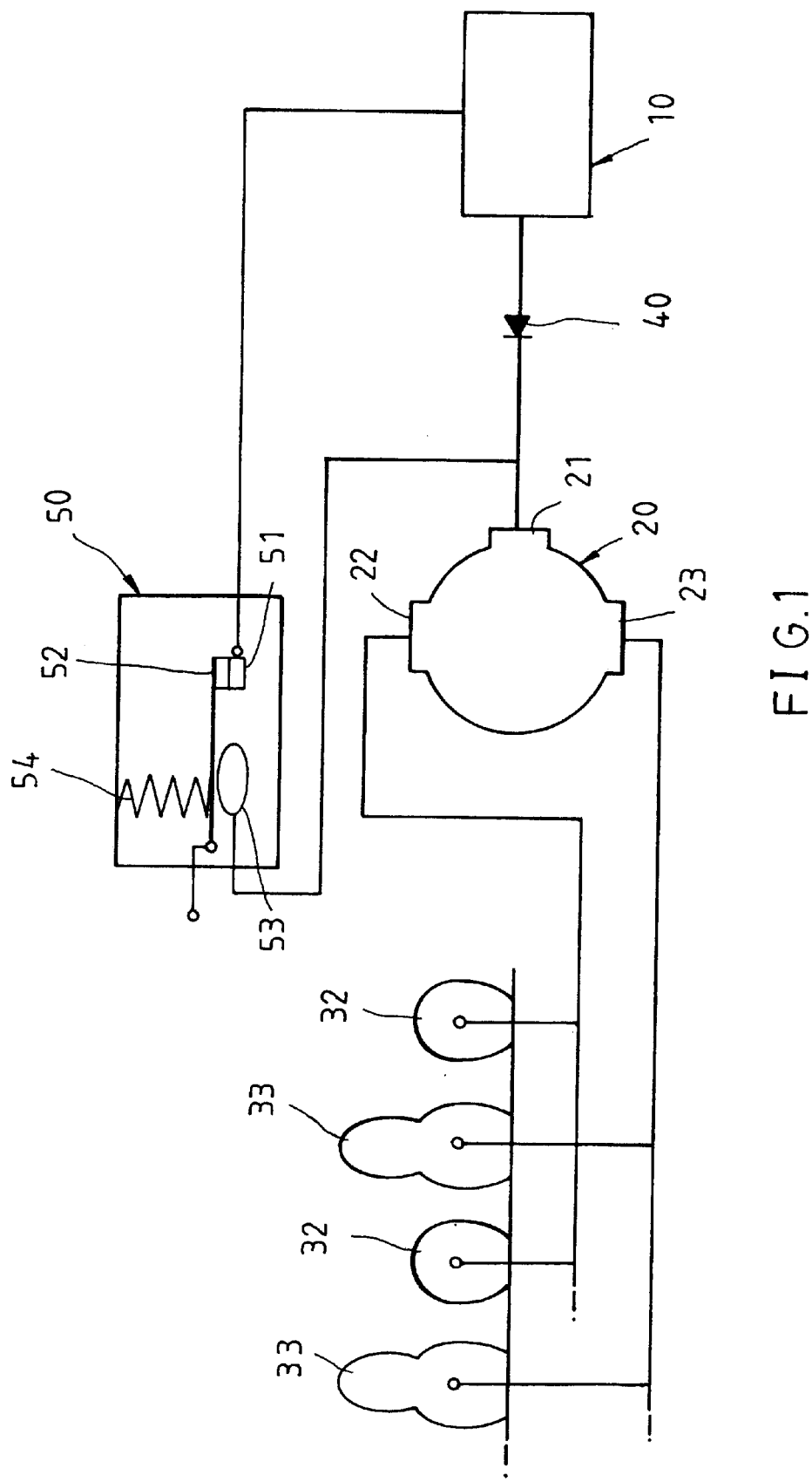
FIG. 1 shows a structural schematic view of a preferred embodiment of the present invention.

As shown in FIG. 1, an inflation device embodied in the present invention comprises an air pump 10, a rotary valve 20, two sets of air sacs 32 and 33, a check valve 40, and a pressure control unit 50.

The air pump 10 is driven by electricity to provide compressed air.

The rotary valve 20 has an inlet 21 to take in the compressed air from the air pump 10, a discharge port (not shown in the drawing) in communication with the atmospheric air, and two outlets 22 and 23. The rotary valve 20 of the present invention is similar in construction to the prior art rotary valve and is driven electrically by a synchronous motor (not shown in the drawing) to enable the inlet 21 to be in communication with the two outlets 22 and 23 in an alternate manner. As the inlet 21 is in communication with the first outlet 22, the second outlet 23 is in communication with the discharge port. In addition, when the first outlet 22 and the second outlet 23 are in the state of alternate communication, they are kept in the state of mutual communication for a time interval before they are in communication with the inlet 21 and the discharge port.

Two sets of air sacs 32 and 33 are respectively in communication with the two outlets 22 and 23 of the rotary valve 20 such that the two sets of air sacs 32 and 33 are kept in the state of periodic and alternate inflation and deflation. The number and the arrangement of the air sacs are dependent on the need of the circumstance under which the inflation device is used.

The check valve 40 is mounted on the pipeline between the pump 10 and the rotary valve 20 and is intended to allow the one-way flow of the compressed air from the pump 10 to the rotary valve 20, thereby preventing the air in the air sacs 32 and 33 from flowing back to the pump 10 at the time when the pump 10 is not in operation.

The pressure control unit 50 comprises a fixed electrode member 51, a pliable electrode member 52, a pressure detecting air sac 53, and an adjustment spring 54. The electrode members 51 and 52 are respectively connected with a power source and a power source input end of the pump 10. In the initial state, these two electrode members 51 and 52 are in contact with each other. The pressure detecting air sac 53 is connected with the pipeline between the rotary valve 20 and the check valve 40. Whenever the pressure in the detecting air sac 53 exceeds a predetermined value, the detecting air sac 53 pushes the pliable electrode member 52 to move away from the fixed electrode member 51, thereby resulting in an interruption of power supply to the pump 10. As the pressure in the detecting air sac 53 is lower than the predetermined value, the two electrode members 51 and 52 come in contact again, thereby resulting in a resumption of power supply to the pump 10. The adjustment spring 54 has one end which urges the pliable electrode member 52. By virtue of the change in the extent of compression of the adjustment spring 54, the value of the pressure of the detecting air sac 53 is so adjusted as to push the pliable electrode member 52 to separate from the fixed electrode member 51.

It must be noted here that the air sacs 32 and 33 are corresponding in number to the outlets 22 and 23 of the rotary valve 20. In other words, when the air sacs 32 and 33 are increased in number, the outlets 22 and 23 of the rotary valve 20 must be increased in number correspondingly.

When the value of the pressure of any one of the air sacs 32 and 33 exceeds the predetermined value of the pressure of the adjustment spring 54, the pressure detecting air sac 53 pushes the pliable electrode member 52 to move away from the fixed electrode member 51 so as to terminate temporarily the power supply of the pump 10. The power supply of the pump 10 is resumed at the time when the pressure value of the air sacs 32 and 33 is lower than the predetermined value. The outlets 22 and 23 of the rotary valve 20 are kept in the state of alternate communication such that the outlets 22 and 23 are in the state of mutual communication for a time interval, thereby enabling the air sac set, which is intended to be deflated, to discharge air into another air sac set which is intended to be inflated. As a result, the pump 10 is not required to operate time after time so as to save energy and to prolong the longevity of the pump 10.

What is claimed is:

1. An inflation device comprising:

a pump driven electrically to provide compressed air;

a rotary valve provided with an inlet, at least two outlets, and a discharge port in communication with atmospheric air, said inlet being in communication with said outlets in an alternate fashion such that the rest of said outlets is in communication with said discharge port at the time when one of said outlets is in communication with said inlet whereby said inlet serves to let in the compressed air from said pump;

at least two sets of air sacs in communication with said outlets of said rotary valve such that said two sets of air sacs are kept in the state of periodic and alternate inflation and deflation; and a pressure control unit comprising a fixed electrode member, a pliable electrode member in contact with said fixed electrode member, and a pressure detecting air sac connected with a pipeline between said pump and said rotary valve, said fixed electrode member and said pliable electrode being connected with a power source and a power source input end of said pump such that said pliable electrode member is pushed by said pressure detecting air sac to separate from said fixed electrode member so as to interrupt the power supply to said pump at such time when air pressure value in said pressure detecting air sac exceeds a predetermined value whereby said pliable electrode member comes in contact again with said fixed electrode member so as to resume the power supply to said pump at the time when the air pressure value in said pressure detecting air sac is smaller than the predetermined value.

2. The inflation device as defined in claim 1 further comprising a check valve mounted on said pipeline to allow one-way flow of the compressed air from said pump to said rotary valve.

3. The inflation device as defined in claim 2, wherein said pressure detecting air sac of said pressure control unit is connected with the pipeline between said check valve and said rotary valve.

4. The inflation device as defined in claim 1, wherein said pressure control unit further comprises an adjustment spring with one end thereof urging said pliable electrode member whereby said adjustment spring is provided with a spring force to adjust air pressure value of said pressure detecting air sac so as to enable said pressure detecting air sac to push said pliable electrode member to move away from said fixed electrode member.

5. The inflation device as defined in claim 1, wherein said outlets of said rotary valve are in the state of alternate communication with said inlet of said rotary valve such that said outlets are in a mutual communication for a predetermined time interval.

* * * * *